United States Patent [19]

Pasternak et al.

[11] Patent Number: 5,736,050
[45] Date of Patent: Apr. 7, 1998

[54] CURRENTS IN NARROW PORES

[75] Inventors: Charles A. Pasternak; Charles L. Bashford, both of London; Donald T. Edmonds, Burford, all of United Kingdom; Adolf A. Lev, St. Petersburg, Russian Federation

[73] Assignee: St. George's Hospital Medical School, United Kingdom

[21] Appl. No.: 481,351
[22] PCT Filed: Jan. 7, 1994
[86] PCT No.: PCT/GB94/00032
§ 371 Date: Nov. 17, 1995
§ 102(e) Date: Nov. 17, 1995
[87] PCT Pub. No.: WO94/15701
PCT Pub. Date: Jul. 21, 1994

[30] Foreign Application Priority Data

Jan. 7, 1993 [GB] United Kingdom .................. 9300479

[51] Int. Cl.$^6$ .................................................. B01D 11/00
[52] U.S. Cl. .................. 210/644; 210/257.2; 210/500.27; 204/600; 204/450
[58] Field of Search ........................... 210/644, 638, 210/257.2, 321.6, 500.27; 204/600, 450, 518, 627, 403; 436/806; 422/82.01

[56] References Cited

U.S. PATENT DOCUMENTS

| 3,097,076 | 7/1963 | Reid et al. |
| 5,503,744 | 4/1996 | Ikematsu et al. ............ 210/257.1 |
| 5,556,528 | 9/1996 | Bohn et al. .................... 204/600 |

FOREIGN PATENT DOCUMENTS

| 0 562 303 A2 | 9/1993 | European Pat. Off. |
| 3831970 A1 | 3/1990 | Germany. |
| WO 90/08783 | 8/1990 | WIPO. |

OTHER PUBLICATIONS

Woodbury, "Pure Lipid Vesicles Can Induce Channel–Like Conductances in Planar Bilayers", J. Membrane Biol., vol. 109, pp. 145–150 (1989).
Antonov et al, "The Appearance of Single–Ion Channels in Unmodified Lipid Bilayer Membranes at the Phase Transition Temperature", Nature, vol. 283, pp. 585–586 (1980).
Korchev et al, "Differential Sensitivity of Pneumolysin–Induced Channels to Gating by Divalent Cations", J. Membrane Biol., vol. 127, pp. 195–203 (1992).
Pasternak et al, "Membrane Damage: Common Mechanisms of Induction and Prevention", FEMS Microbiology Immunology, vol. 105, pp. 83–92 (1992).
Bashford et al, "Membrane Damage by Hemolytic Viruses, Toxins, Complement, and Other Cytotoxic Agents", The Journal of Biological Chemistry, vol. 261, pp. 9300–9308 (1986).
Lev et al, In: Biophysics of Membrane Transport, Proc. 11th School, "Lipid Impregnated Nuclear Filters as a New Model for Studies of Surface Conductance and Single Channel Phenomena", (1992), pp. 322–349.
Barrer et al, "Self–Diffusion of Alkali Metal Ions in Analcite", Trans Faraday Soc., vol. 56, pp. 709–721 (1960).
Edmonds "Membrane Ion Channels and Ionic Hydration Energies", Proc. R. Soc. B., vol. 211, pp. 51–62 (1980).

(List continued on next page.)

*Primary Examiner*—Ana Fortuna
*Attorney, Agent, or Firm*—Nixon & Vanderhye

[57] ABSTRACT

Current fluctuations typical of those observed with biological channels which are ion selective and inhibited by divalent cations and protons have been observed in synthetic membranes, and a process for controlling permeability of a synthetic membrane to ions and uncharged molecules may be used in a switch or sensor, for example to monitor the content of a solution, to trigger macroscopic events by local microscopic changes and to alter the ionic content of a solution e.g. desalination.

10 Claims, 7 Drawing Sheets

APPARATUS TO MONITOR ION CURRENTS IN A TRACK-ETCHED, POLYETHYLENE TEREPHTHALATE FILTER.

OTHER PUBLICATIONS

Edmonds, "The Ordered Water Model of Membrane Ion Channels", Biological Membranes, vol. 5, pp. 350–387 (1984), (Ed. D. Chapman Academic Press Inc.).

MacKay et al, "Structure and Dynamics of Ion Transport Through Gramicidin A", Biophys. J. Biophysical Society, vol. 46, Aug. 1984, pp. 229–248.

Barrer et al, "Ion–Exchange in Crystals of Analcite and Leucite", J. Chem. Soc., pp. 1879–1888 (1953).

Papazian et al, "Alteration of Voltage–Dependence of Shaker Potassium Channel by Mutations in the S4 Sequence", Nature, vol. 349, pp. 305–310, (1991).

Yool et al, "Alteration of Ionic Selectivity of a $K^+$ Channel by Mutation of the H5 Region", Nature, vol. 349, (1991), pp. 700–704.

Stuhmer et al, "Structural Parts Involved in Activation and Inactivation of the Sodium Channel", Nature, vol. 339, pp. 597–603, (1989).

Krasilnikov et al, "The Structure of *Staphylococcus aureus* α–Toxin–Induced Ionic Channel", Gen. Physiol. Biophys. (1988), pp. 467–473.

Journal of Membrane Science, 68 (1992) pp. 263–270, Sudareva et al 'Increase in the Efficiency of Membrane Fractionation'.

Environmental Science and Technology, Mar., Nop. 3, Washington, D.C., pp. 569–577, Kilduff et al 'Transport and Separation of Organic Macromolecules in Ultrafiltration'., 1992.

Neher et al, Nature, vol. 260, Apr. 29, 1976, "Single–Channel Currents Recorded from Membrane of Devervated Frog Muscle Fibres", pp. 799–802.

Hille, "Ionic Channels of Excitable Membranes", Sinauer Associates Inc., Sunderland, Mass. (1984), pp. 277, 303–353.

Apel et al, "Track Structure in Some Heavy–on Irradiated Plastic Films", Nucl. Tracks Radiat. Meas., vol. 17, No. 3, pp. 191–193, 1990.

Pasternak, et al. Proc. Symp., "Surface Modification—Principles and Applications" (1992), Colloids and Surfaces A. 77 (1993), pp. 119–124.

Bezrukov et al, Bull. Am. Phys. Soc., "Noise of Protonation is Observed in the current of α–toxin Channels", vol. 37, No. 1 (1992), p. 625.

Powell, III, In: Handbook of Water–Soluble Gums and Resins (ed RL Davidson McGraw Hill, NY pp. 18–1 to 18–31 (1980).

Granick "Motions and Relaxations of Confined Liquids", Science, vol. 253, pp. 1374–1379 (1980).

Lundstrom, "Some Electrical and Structural Properties of Lipid–Water Systems", In: Structure of Biological Molecules (Ed. Abrahamsson S and Pascher I) Plenum Press, NY, pp. 293–306 (1977).

Bezrukov et al, "Large–Scale Conductance Fluctuations in Solutions of Strong Electrolytes", Physics B 159 (1989), pp. 388–398.

Prats et al, Nature, "Lateral Proton conduction at Lipid–Water Interfaces and its Implications for the Chemiosmotic–Coupling Hypothesis" vol. 322, pp. 756–758 (1986).

Stein et al, "Transport and Diffusion Across Cell Membranes", Academic Press, Inc., pp. 127–137 (1986).

Schlieper et al, "Triton X–100 as a Channel–Forming Substance in Artificial Lipid Bilayer Membranes", Archives of Biochemistry and Biphysics, vol. 184, pp. 204–208 (1977).

TKR 14

TKR 13

TKR 10

APPARATUS TO MONITOR ION CURRENTS IN A TRACK-ETCHED, POLYETHYLENE TEREPHTHALATE FILTER.

FREQUENCY DISTRIBUTION OF IONIC CONDUCTIVITY (A)
AND CALCULATED DIAMETER (B) OF PORES IN A
TRACK - ETCHED, PETP - FILTER.

FILTERS (1.4 x 10$^9$ PORES/cm$^2$), 1.0M KCl, 0.005M HEPES pH 7.4 IN
BATH AND PIPETTE

PATCH - PIPETTE CURRENTS FROM A TRACK - ETCHED, PETP - FILTER FILTER (1.4 x 10⁹ PORES/cm²) ON 0.1M KCl, 0.005M HEPES, pH 7.4 PIPETTE (~1 μm DIAMETER) FILLED WITH A SIMILAR SOLUTION.

CURRENTS IN NARROW PORES

The present invention relates to a process for controlling the permeability to ions or uncharged molecules of a synthetic membrane, and to switching and sensor devices which use this effect.

The characteristic feature of ion channels in biological membranes is that when an electric potential is applied across the membrane, the resultant current fluctuates between a conducting and a non-conducting state [1]. To date most explanations of this phenomenon have been based on the notion that conducting and non-conducting states represent "open" and "closed" configurations of the channel, and that the transition between them results from the physical movement of part of the channel structure,—the opening and closing of some kind of "gate" [2].

The applicants have found that current fluctuations typical of those observed with biological channels can be observed with purely synthetic membrane filters that may be devoid of any added lipid or protein. Two other features of biological ion channels are ion selectivity and inhibition by divalent cations and protons [2]; these too are displayed when current across synthetic membrane filters is measured. It is believed that the results may be interpreted in terms of the special properties of ion conductance through water that is confined near an interface; they may be observed whenever the contribution of bulk conductance is minimal, such as in a narrow pore having a high surface to volume ratio.

Flow of electrolytes or non-electrolytes through pores in biological membranes that are induced by agents as varied as certain haemolytic viruses, bacterial or animal toxins, immune molecules or detergents at sub-lytic concentration show properties that are remarkably similar from agent to agent. These include inhibition by divalent cations, with relative efficacy $Zn^{2+}>Ca^{2+}>Mg^{2+}$ and, when the agents are incorporated into planar lipid bilayers with an applied voltage across them, fluctuations in current typical of "single channel" openings and closings of endogenous ion channels; in several of these systems protons also inhibit flow (with relative efficacy $H^+>Zn^{2+}$).

The applicants have studied flow (i.e. current) of non-electrolytes and electrolytes through purely synthetic membrane filters and find the same effect of divalent cations and protons, provided the membrane pores are narrow enough. It is concluded that these effects are features of flow along any liquid—solid interface, that can be observed wherever the contribution of bulk is minimised (as in the case of very narrow pores).

The word "pore" in the context of the present invention is intended to include a hole through a membrane or the space between two apposed surfaces that may be two solids or two lipid monolayers.

For simplicity the term "membrane" is used in the present description, but it is to be understood that, unless otherwise specified, this term encompasses films or sheets of any shape and thickness and whose thickness may or may not be uniform, and also encompasses the combination of two solids or two lipid monolayers whose relative configuration forms at least one pore as defined above.

The possible applications of a switching device based on synthetic organic materials are wide ranging. Some are listed below:

(1) a switched pore can control the transfer of particular solvent and solute molecules across an otherwise impermeable membrane which has applications in chemical engineering.

(2) a pore that may be switched from low to high conductance can also serve as a sensitive detector of particular conditions such as pH and ionic strength or even an elevation in the concentration of a particular solute molecule. Such a detector may have a very high gain (or amplification) in that the concentration change required to switch the pore conductance may be very much smaller than the detected flow through the pore when it is opened. Applications of this effect include chemical and medical monitoring of solutions with the rapid detection of changes in specific constituents of the solution.

(3) A pore is switched from high to low conductance by the particular conditions that prevail within the pore or in the immediate vicinity of its two ends. Thus by special preparation of this very local environment, for example by introducing specific chemical entities in these regions, the macroscopic bulk flow through the pore is controlled by changes in the chemical environment of these microscopic regions. This again renders it possible for macroscopic events to be triggered by extremely local changes which will have applications in process control.

(4) As in semiconductor physics, once a switch has been developed, then amplifying devices with controlled gain are obtained by the application of negative feedback around the switch and oscillators are obtained by the application of positive feedback around the switch. The rapidity of the switch leads to the possibility of high frequency devices.

(5) Since flow of ions is more sensitive to inhibition by divalent cations and protons than is flow of water, the membrane may be used to alter the ionic content of a solution; an important application in this respect is in desalination processes.

The present invention provides a process for controlling permeability to ions and uncharged molecules through a pore as defined herein having discrete states of differing permeability and being of less than 10 nanometers radius or 20 nanometers width, which process comprises placing the pore between a first solution containing an ion (the transport ion), or uncharged molecule capable of passing through the pore, and a second solution;

and controlling the permeability of ions or uncharged molecules through the pore by means of the transport ion concentration in the first solution and/or the proton or multivalent ion concentration in the first and/or second solution.

Thus the invention also includes a process in which the laminar flow of ions or uncharged molecules between two apposed membranes, separated by <20 nm, may be controlled by the proton or multivalent ion concentration as described above.

The present invention also provides a switch for ionic current comprising a pore of less than 10 nm radius through a synthetic membrane film or comprising two apposed synthetic membranes less than 20 nm apart forming a pore between the membranes, said pore being simultaneously in contact with a first ionic solution containing an ion capable of being transported through the membrane pore, the transport ion, and with a second ionic solution, such that when the switch is placed in an electric circuit, flow of ionic current though the pore is controlled by transport ion concentration in the first ionic solution and/or the proton or multivalent ion concentration in one or both of the said ionic solutions.

The present invention also provides a sensor for sensing a parameter in a solution such as pH, ionic strength or solute concentration, said sensor comprising a pore of less than 10 nanometers radius through a synthetic membrane or comprising two apposed synthetic membranes less than 20 nm apart forming a pore between the membranes, such that when the pore is placed in contact with the solution whose parameter is to be detected, the ionic current passing through the pore is indicative of the presence, absence or level of the parameter to be detected.

DETAILED DESCRIPTION

The term "ionic solution" in this context refers to a solution containing ions which may be e.g. a solution of an ionic material, such as a salt, dissolved in an appropriate solvent, or may be simply a liquid, such as water, in which a proportion of the liquid exists in the form of ions.

Suitable ions which may be transported through the membrane pore include alkali metal ions (e.g. $Li^+$, $Na^+$, $K^+$, $Rb^+$), halide ions (e.g. $F^-$, $Cl^-$, $Br^-$, $I^-$) and multivalent ions (e.g. $Mg^{2+}$, $Ca^{2+}$, $SO_4^{2-}$, phosphate). Preferred ions will depend on the use to which the process is being applied e.g. desalination.

Suitable solute molecules which may be transported include water soluble molecules whose effective size is less than the effective cross-sectional area or width of the pore (e.g. sugars such as glucose, amino acids, certain hormones, neurotransmitters, drugs, immune molecules or polymers such as polyethylene glycol).

Current switching behaviour typical of that observed in an ionic channel in a naturally occurring membrane may be reproduced by a synthetic membrane containing narrow pores. The membrane may be a plastic film such as a polycarbonate or other polyester, e.g. polyethylene terephthalate (PETP). The applicants have investigated PETP films of 5 or 10 micrometers thickness and found them to display the effect of the invention, but thinner or thicker films could be used, depending on the requirements of the use to which the process is being applied. For example, the minimum thickness may depend inter alia on physical characteristics such as the ability of the film to be handled by the manufacturer or user and on the pressure the film is subject to during use. For electrical devices (e.g. sensors) thin films are likely to prove optimal. For flow devices (e.g. desalination) thick films are likely to prove optimal; alternatively laminar flow between two apposed membranes may be used.

The applicants believe that other synthetic membranes exposed to the track-etch procedure described below are also suitable for use in the present process; these include polymers that are positively charged as well as those like PETP that are negatively charged after track etching. In the case of positively charged membranes, some of the properties e.g. selectivity and inhibition by protons can be reversed.

Narrow pores in plastic films such as polyester, e.g. PETP, may be formed by irradiating the film with heavy ions such as $^{132}Xe$, $^{129}Xe$, $^{84}Kr$ or $^{59}Co$ accelerated in a cyclotron, to produce tracks; the polymer is then treated with a hot alkali [3] to hydrolyse parts of the polymer thereby causing local solubilization of the film material particularly in the regions affected by the heavy ion irradiation. The whole process is called track-etching.

In the case of laminar flow between two apposed membranes track-etching of the membrane in order to create narrow pores is unnecessary, but chemical treatment e.g. etching alone of the surfaces may be required.

In the track-etching process cylindrical or conical pores are formed which penetrate the film. The pore diameter depends on the energy and species of heavy ions used for the film irradiation, on the type of polymer used and especially on the conditions of the etching process.

To achieve membranes which may display the effect of the present invention, beams of heavy ions may be used which typically have the following energies: $^{132}Xe$(121 MeV), $^{129}Xe$(124 MeV), $^{84}Kr$(74 MeV) and $^{59}Co$(68 MeV), with an ion fluence of from $6\times10^5$ to $1\times10^{11}$ $cm^{-2}$. Appropriate alkalis and temperatures for the use in this method would be evident to the ordinarily skilled person, and for materials such as PETP include e.g. 0.1M NaOH, 1.0M $K_2CO_3$ and 2.5M $K_2CO_3$ used at a temperature of about 80° C.

For the purposes of the present invention the pore diameter or width should be less than 20 nanometers.

The chemical etching of pores into a material such as polyethylene terephthalate results in hydrolysis of the PETP generating free carboxyl groups making the pores in the membrane more hydrophilic, but other possible membrane materials could be used.

The density of pores in the membranes that the applicants have studied so far range from 1 to $5\times10^9$ pores per $cm^2$ but there is no reason to suppose that higher pore densities could not also be used. The properties of individual pores are independent of pore density. For electrical devices (e.g. sensors) the pore density should be low. For flow devices (e.g. desalination) the pore density should be high; an alternative mode in the latter case is for flow to be between two closely apposed membranes such that the space between them is less than 20 nm.

Transfer of ions, i.e. ion current across such membranes may exhibit rapid switching from a high conductivity to a low conductivity state, even when the voltage across the membrane is held fixed. The rapid switching shown by such a narrow pore membrane resembles the rapid switching shown by biological ion channels. This switching may be observed whenever the ratio of surface area to volume of the conducting phase is high, such as in narrow pores or in the space between two closely apposed solid surfaces or lipid monolayers. Switching can be modified and controlled by controlling the amount of particular ions such as protons and multivalent ions in solution. This control may be achieved by adding protons or a source of multivalent ions, and may be reversed by adding alkali to remove such protons or a sequestrant such as ethylene diamine tetraacetic acid (EDTA) to remove multivalent ions. The control of conduction through the narrow pore includes control of the transfer of water and uncharged molecules as well as ions.

The following examples illustrate the invention.

EXAMPLE 1

The filters used were approximately 5 μm thick and made of polyethylene terephthalate (PETP; "Lavsan"). After heavy ion bombardment to induce nuclear tracks, the filters were "etched" with hot alkali; this treatment breaks (hydrolyses) some of the ester bonds generating free carboxyl groups. These may be negatively charged and make the filters more hydrophilic [3]. Two separate filters, having slightly different apparent pore sizes were used. They are referred to throughout as filter 1 and filter 2. The pore density for each filter was approximately 1 pore/cm$^2$.

Filters were clamped between two small chambers (volume 0.3 ml each) which contained KCl (0.1–3M), buffered with 0.005M Hepes pH 7.4, respectively. Current was measured at room temperature with Ag/AgCl electrodes monitored with a virtual grounded operational amplifier with a feed-back resistor of $10^9$ ohms.

Figure 1A:
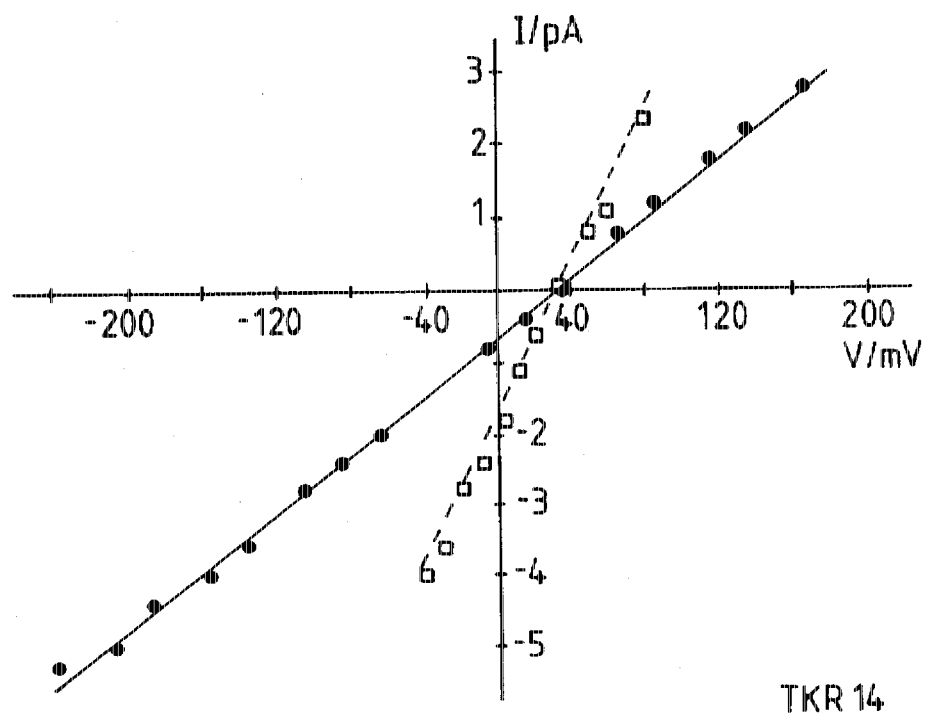
FIG. 1A: shows how current varies as a function of applied potential for two filters.

The membrane switches between a high conducting or "on" state and a low conducting or "off" state. The reversal potential, i.e. the sign and magnitude of the voltage ($\psi$) at zero current was used to deduce the selectivity of the filters for cations over anions, in the presence of a five-fold gradient of KCl. The modal current in the high conducting state is obtained from amplitude histograms as described hereafter. In FIG. 1A this current is plotted as a function of applied potential for filter 1(□) and filter 2(●). The selectivity ($t_+$) was calculated from the reversal potential ($\psi$) using the equation (I):

$$t_+ = 1/2 \left( 1 + \frac{\psi}{\frac{RT}{F} \ln \frac{[K^+]\,trans}{[K^+]\,cis}} \right) \quad (I)$$

The terms "trans" and "cis" are used to identify the compartments on either side of the membrane.

The experiments illustrated in FIG. 1A show the reversal potential to be 35 mV for each filter, indicating a selectivity value for cations over anions ($t_+$) of 0.93.

The relative pore sizes of the two filters are estimated by assessing the effect on conductivity of solutions of a non-electrolyte, polyethylene glycol (PEG), of varying molecular weight. If the non-electrolyte is able to pass through the pore, conductivity is decreased; if not, it is unaffected. By determining the size of the non-electrolyte that is unable to pass through the filter, an estimate of its average pore size can be obtained.

Figure 1B:
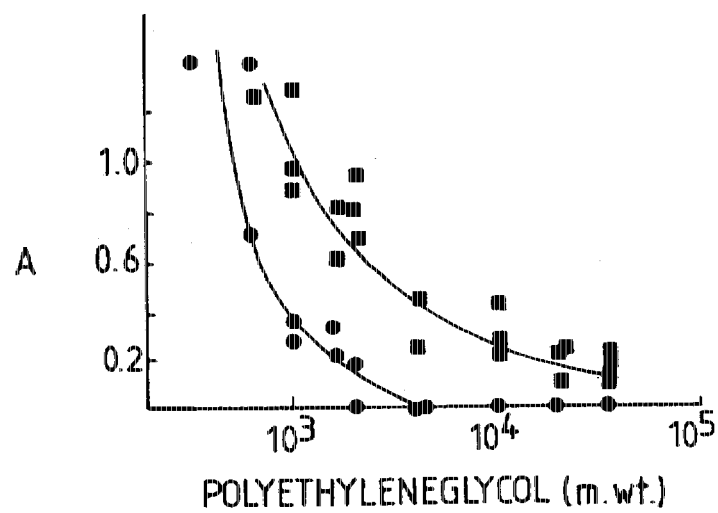
FIG. 1B: shows how conductivity varies in the presence of a solution of polyethylene glycol of varying molecular weight.

The conductivity of the pore in the presence or absence of 20% (v/v) polyethylene glycol (PEG) of differing molecular weights is compared. The conductances (G) are calculated from the modal current of the highest conducting state at a potential of 0.2V for each filter in the presence of 20% PEG relative to that in the absence of PEG. The conductances for filter 1(□) and filter 2(●) are shown in FIG. 1B and expressed as set out in equation II as the ratio (A) of that parameter with the same parameter but measured in the absence of the filter:

$$A = \frac{(G^{filter}/G^{filter+PEG}) - 1}{(G^{solvent}/G^{solvent+PEG}) - 1} \quad (II)$$

The approximate size of PEG which results in "cut off" is considered to be the size which yields a value of A of 0.5. This size was found at molecular weights of ~3000 for filter 1 and ~1000 for filter 2. Based on the "exclusion" volume of PEGs in water, these correspond to pore radii of about 1.4 nm for filter 1 and 1 nm for filter 2. It is seen that the pore in filter 2 appears to be somewhat narrower than that in filter 1, compatible with a lower conductance (FIG. 1A).

Figure 2:
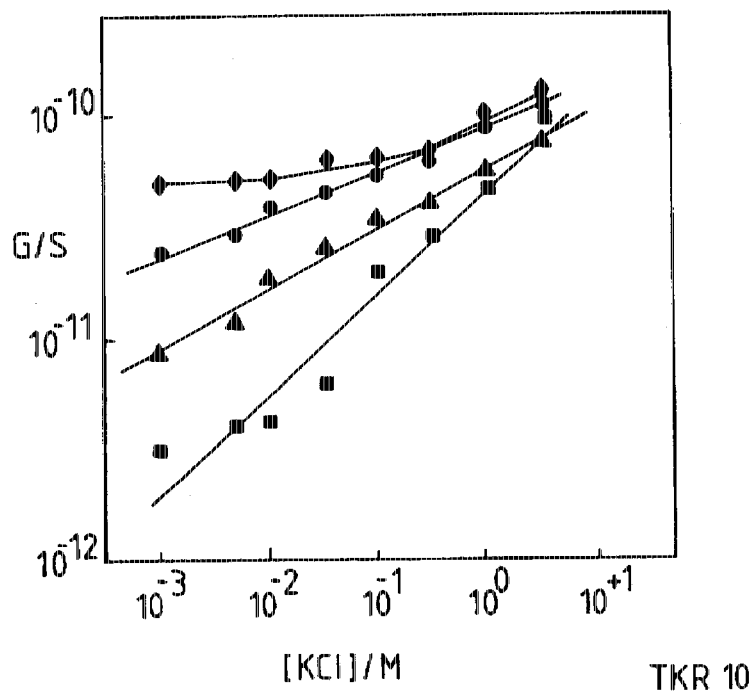
FIG. 2: shows the dependence of pore conductance on ionic strength as a double logarithmic plot.

The dependence of pore conductance on ionic strength is shown in FIG. 2 as a double logarithmic plot. Identical solutions containing KCl at the concentration indicated in FIG. 2 with $10^{-4}$–$3 \times 10^{-3}$M EDTA and 0.005M Hepes at pH 11(♦), 8.3(●), 7.5(▲) or 6.5(■) bathed each face of filter 2. Conductance (G) of the highest conducting state at an applied potential of 0.8V is shown. Similar data were obtained at an applied potential of 0.2V, except that at pH 6.5 the high conducting state was not observed.

At pH 11 conductance is almost independent of ionic strength for current (I)≦0.1. At lower pH values the conductance has a linear dependence on I but with a slope much less than unity. These results suggest that negative charges either in the pore or close to its mouth exert considerable influence on the conductance by causing the local cation concentration greatly to exceed that in the bulk solution. The change of slope over the range of pH values tested suggests that the negative charges titrate with an effective pK around neutrality. Current fluctuations are maximal around this pH, with smaller, fewer fluctuations above or below it [4]. Such an effect has recently been observed with *S. aureus* α-toxin induced pores across lipid bilayers also [5].

Figure 3C:
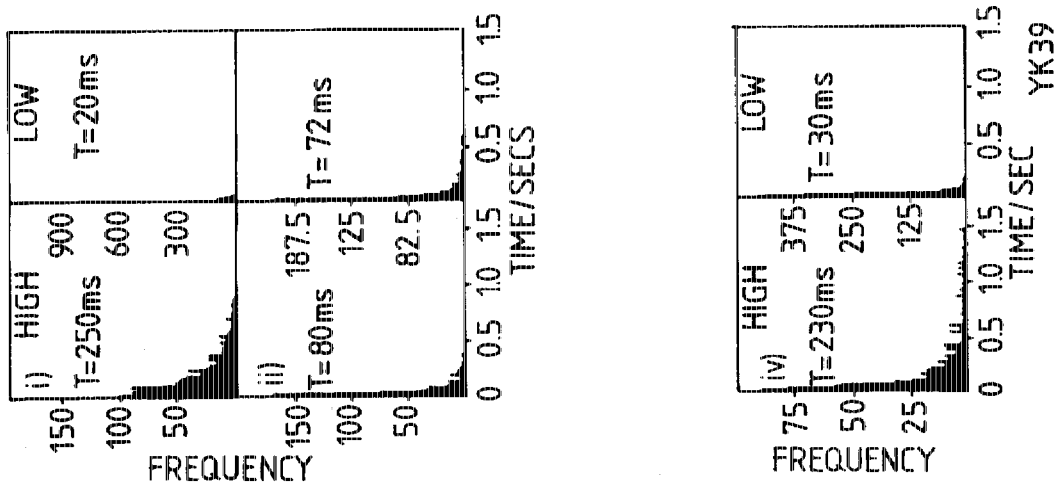
FIG. 3C: shows time distribution histograms for the high and low conducting states.
Figure 3B:
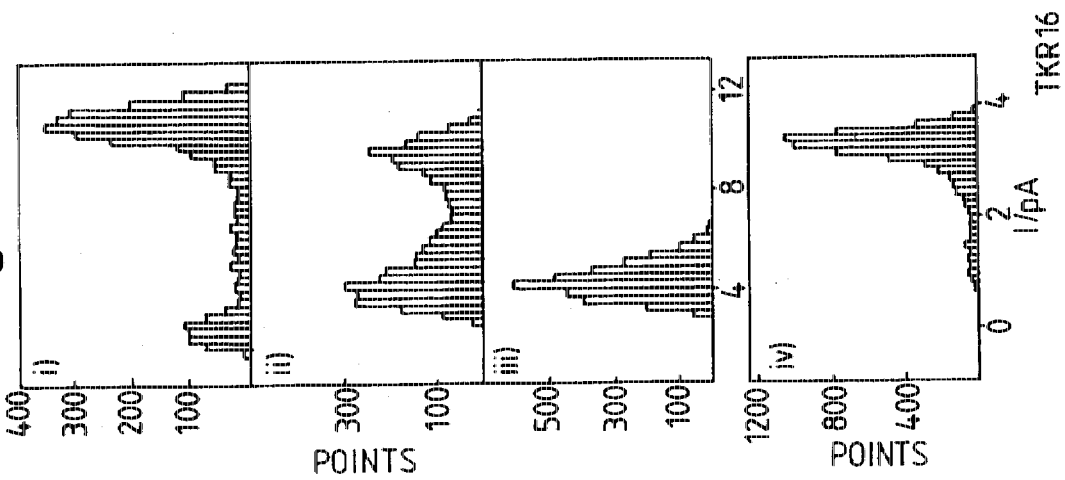
FIG. 3B: shows the amplitude distribution histograms of the current in the predominant conducting states.
Figure 3A:
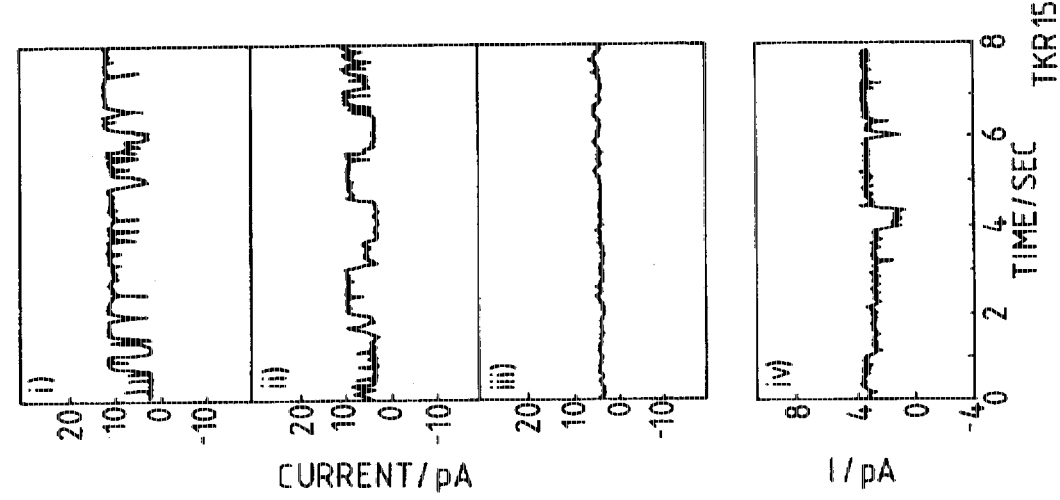
FIG. 3A: shows representative current fluctuations across filters as a function of time.

Current fluctuations across the filters were measured and typical records of current are shown in FIG. 3A. Filter 1 was bathed in 0.1M KCl, 0.005M Hepes pH 7.4 without (i) or with $3.10^{-4}$M (ii) or $3.10^{-3}$M CaCl$_2$ (iii); filter 2 (iv) was bathed in a similar medium without CaCl$_2$ at pH 8.0; currents at 0.2V were recorded on videotape using a Biologic PCM Instrumentation Recorder and subsequently analysed using Cambridge Electronic Design Patch and Voltage-Clamp software. FIG. 3A shows representative traces. Discrete changes between conducting and non-conducting states are seen.

Analysis of the two predominant states (FIG. 3B) shows the higher one to be 11 pA and the lower one 2.5 pA for filter 1. For filter 2 the values are 3.3 pA and 1.2 pA. The lower state is unlikely to represent a "leak" current, as (a) it changes on the addition of Ca$^{2+}$ (see below), (b) it disappears altogether at low pH and (c) it is not seen if the filter is moved so that there is no pore at all between the two chambers.

FIG. 3C presents time distribution histograms for the high and low conducting states respectively together with the time constants for each state obtained by fitting a single exponential to the distribution. For filter 1 mean values (±S.D.) of the time constant for the high conducting state ($\tau_H$) of 210±59 ms and of the low conducting state ($\tau_L$) of 23±8.7 ms (n=8) were found.

The difference between the high and low conductance states varies with voltage and ionic strength.

The amplitude of the difference between the current of the high and low conducting states as a function of applied voltage or of the ionic concentration of the bathing medium are shown in table 1 below; n.d. indicates a value was not determined.

TABLE 1

Difference in current between the high and low conducting states of filter 2 at different potentials and ionic strengths.

| Applied potential/V | current/pA | |
|---|---|---|
| | 0.1M KCl | 0.2M KCl |
| 0.2 | 2.7 | 4.0 |
| 0.4 | 5.5 | 7.0 |
| 0.6 | 8.8 | n.d. |

Although the absolute value of the higher conductance state depends somewhat on the pre-treatment of the filter prior to use (e.g. exposure to ethanol, lipids, other chemicals, etc) the difference in amplitude between the higher conductance state and the lower one is remarkably constant. Other factors, such as pH (FIG. 2) or the presence of divalent cations (see below) do affect both conductance states. On the addition of 0.3 mM $Ca^{2+}$, for example, the difference between the higher and lower conducting state is decreased to 9.5 and 3.5 pA respectively for filter 1 (FIG. 3B). Such intermediate amplitudes also become detectable in the absence of $Ca^{2+}$ if a long enough recording is analysed. Addition of 3 mM $Ca^{2+}$ abolishes the high conducting state completely; high conductance is restored by the addition of EDTA (not shown). Similar effects are observed by addition of other divalent cations such as $Zn^{2+}$ or $Mg^{2+}$, or by reduction of pH.

Figure 4A:
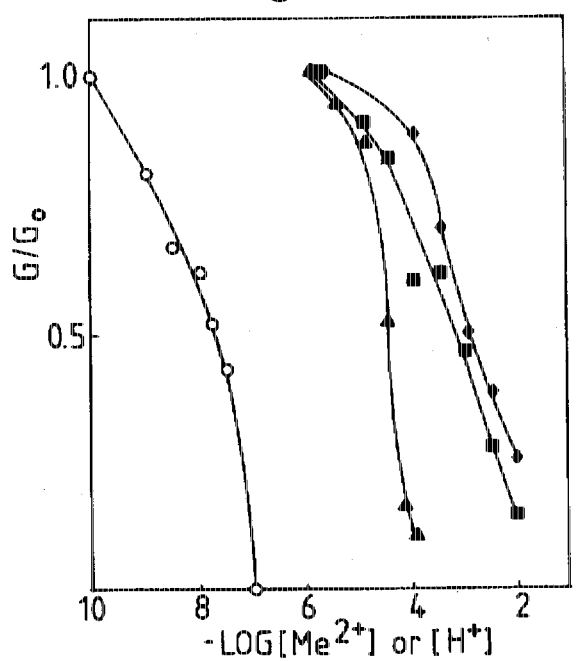
FIGS. 4A and 4B: shows how the conductivity varies with the concentration of divlent cation or proton.
Figure 4B:
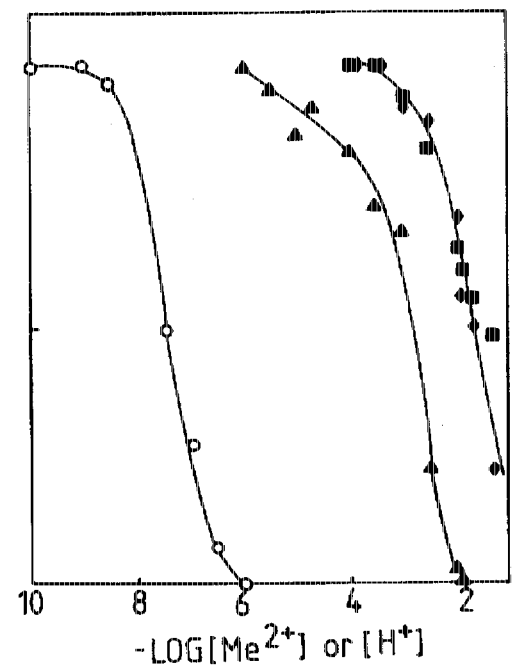
Figure 4C:
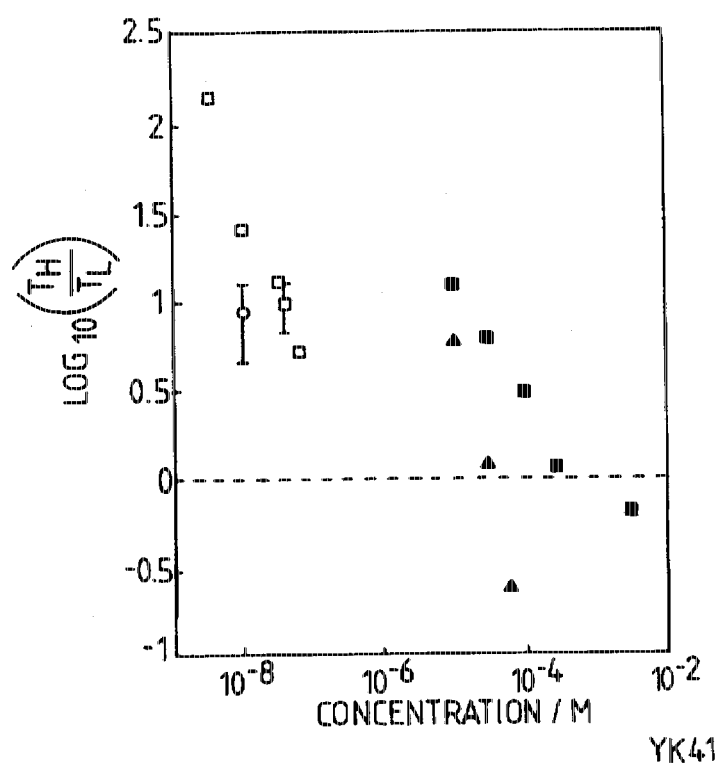
FIG. 4C: shows how the logarithm of the ratio of the time constants for the high and low conducting states varies with the concentration of divalent cation or proton.

The relative efficacy of divalent cations and protons at reducing current is shown in FIG. 4. Filter 1 was bathed in 0.1M KCl (FIG. 4A) or 3M KCl (FIG. 4B) with 0.005M Hepes, initial pH 7.4, $H^+/OH^-$(o) or divalent cations (at pH 7.4: $Zn^{2+}$(▲), $Ca^{2+}$(■), $Mg^{2+}$(♦)) were added to give the final concentrations indicated. The time-averaged conductance (G) at 0.2V is expressed relative to the maximum observed conductance ($G_o$) at the start of each titration. FIG. 4C presents the logarithm of the ratio of the time constants for the high ($\tau_H$) and low ($\tau_L$) conducting states obtained at 0.2V in 0.1M KCl, 0.005M Hepes at the pH specified (□—filter 1; ○—filter 2) or in a similar medium at pH 7.4 (filter 1) containing the concentration of $CaCl_2$(■) or $ZnSO_4$ (▲) indicated; error bars represent the standard deviation found for filter 1 (n=8) at pH 7.4 and for filter 2 (n=4) at pH 8.0.

It is seen from FIGS. 4A and 4B that in both cases $H^+>Zn^{2+}>Ca^{2+}\geq Mg^{2+}$ with 50% inhibition at molar concentrations of approximately $10^{-7.7}$, $10^{-4.5}$, $10^{-3.4}$, and $10^{-3.0}$ (0.1M KCl) and $10^{-7.5}$, $10^{-2.8}$, $10^{-1.7}$ and $10^{-1.7}$ (3M KCl) respectively for filter 1, and $10^{-8.4}$, $10^{-6.0}$, $10^{-4.2}$, and $10^{-4.2}$ (0.1M KCl) for filter 2 (not shown). The fact that inhibition is little different in 0.1M and 3M KCl suggests that simple screening of surface charge plays at best a minor role. The data points in FIG. 4A and 4B are derived from time-averaged conductances. Kinetic analysis (as in FIG. 3C) of fluctuations observed in the presence of divalent cations and protons is shown in FIG. 4C. Both sets of data show that filter 2 is more sensitive to inhibition by divalent cations and protons, again compatible with a smaller apparent pore size (see FIG. 1B).

Ionic conduction in narrow pores may well be similar to that which occurs in some hydrated zeolites where it can be shown [6] that only the bare ion moves, although it is at all times hydrated by an essentially static array of water molecules. Calculation [7] shows that the centres of the planar pentagon and puckered hexagon water rings that preserve tetrahedral bonding can provide low energy ion binding sites. The origin of the rapid switching maybe connected with the fact that lattice sums [8] and molecular dynamic simulations [9] show that water in narrow pores will be electrically ordered. Changes in order could lead to switching [8] due to the powerful electric fields generated.

An alternative explanation of the switching is that changes in the nature of the ions absorbed on the pore walls alter the water structure near the pore walls and hence the pore conductance. In zeolites it is known [10] that exchange between cations in the bathing solution and the aluminasilicate cage can lead to phase changes in the cages and hence of the water contained within them. Such metastability may account for rapid transitions in the conductance through narrow pores. In a biological system the channel protein must also supply a gating mechanism sensitive to the membrane voltage [11] and to the presence of particular ligands [2], which may be in series with the water-pore gating described here. In addition the protein must distinguish between different cations [12] and carry out other activities such as inactivation [13].

EXAMPLE 2

Individual pores in track-etched PETP filters containing up to $5 \times 10^9$ pores $cm^{-2}$ also exhibit selective ion flow and rapid switching between discrete conductance states provided that their overall ionic conductivity is sufficiently low (less than 100 pS in 0.1M KCl).

Figure 5:
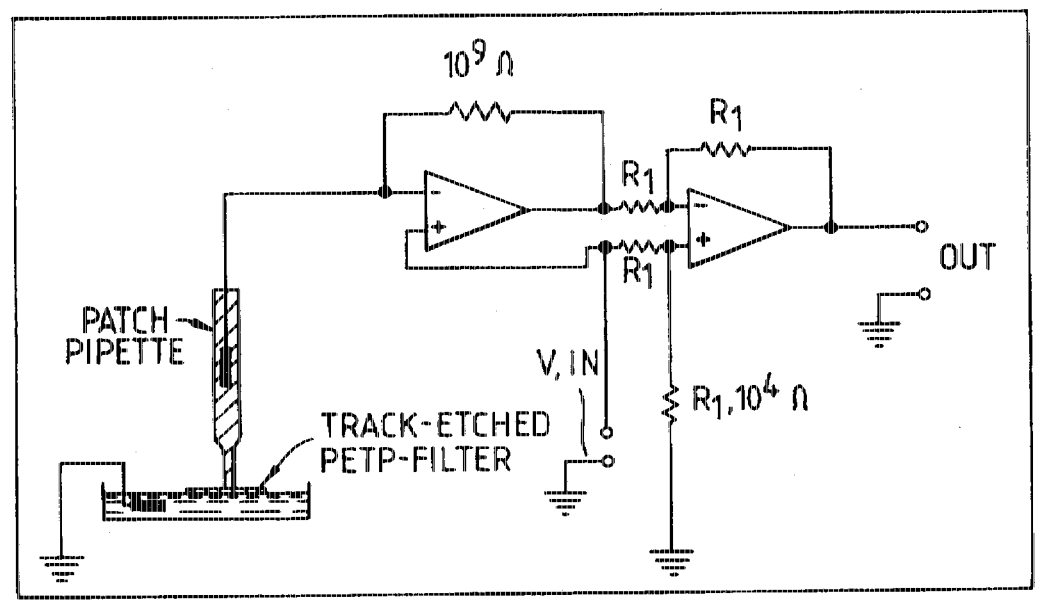
FIG. 5: shows the apparatus used to monitor ion currents through one or a few pores in a track-etched polyethylene terephthalate (PETP) filter containing many pores.
Figure 6A:
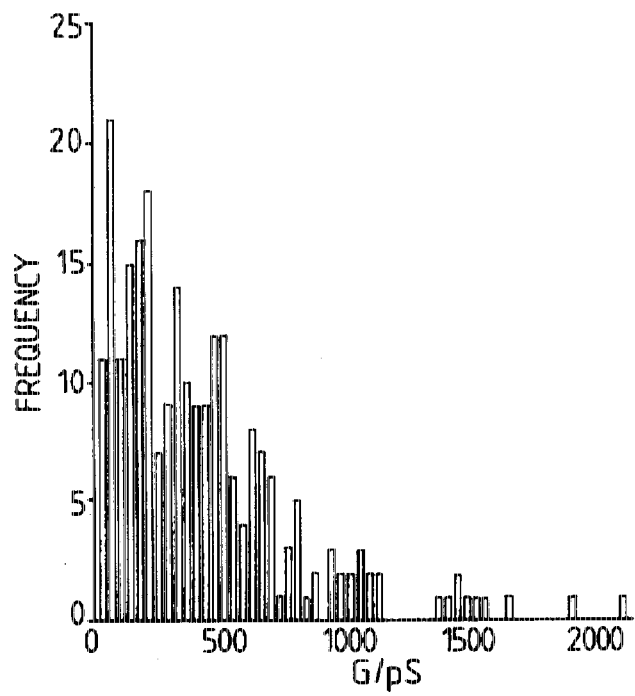
FIGS. 6A and B: shows the frequency distribution of ionic conductivity (A) and calculated diameter (B) of pores in a track-etched PETP filter.
Figure 6B:
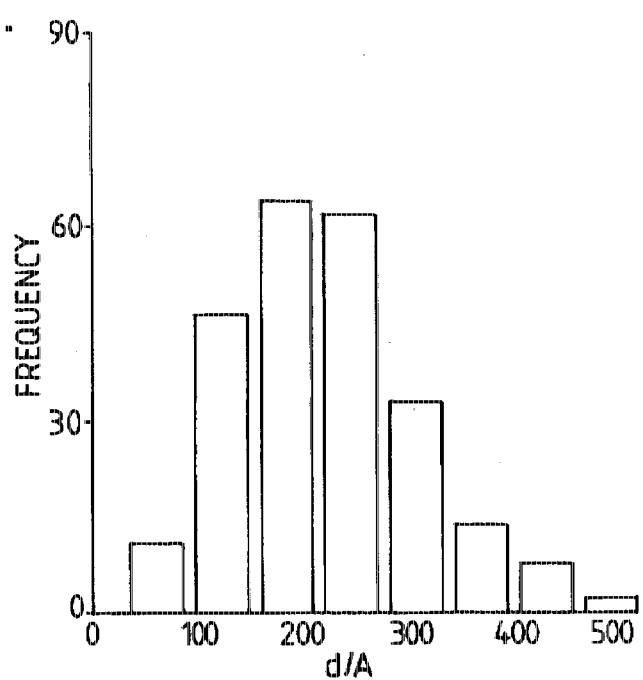

Such pores can be studied with glass micropipettes (1) having a tip diameter of about 1 μm using the apparatus illustrated in FIG. 5; ion currents through the pores in the filter (between bath and pipette) are monitored with Ag/AgCl electrodes in the electronic circuit shown. When bath and pipette each contain 1M KCl with 0.005M Hepes, pH adjusted to 7.4 with KOH the conductance recorded each time the pipette contacts the filter falls in the range 5 to 2000 pS as shown in FIG. 6 (left hand panel). Assuming that each conductance represents that through a cylindrical pore in a 10 μm thick filter, the diameter of that pore can be calculated and the results of such calculations are shown in FIG. 6, right hand panel. Pore diameters exhibit an approximately normal distribution with a mean close to 200 Å.

Figure 7:
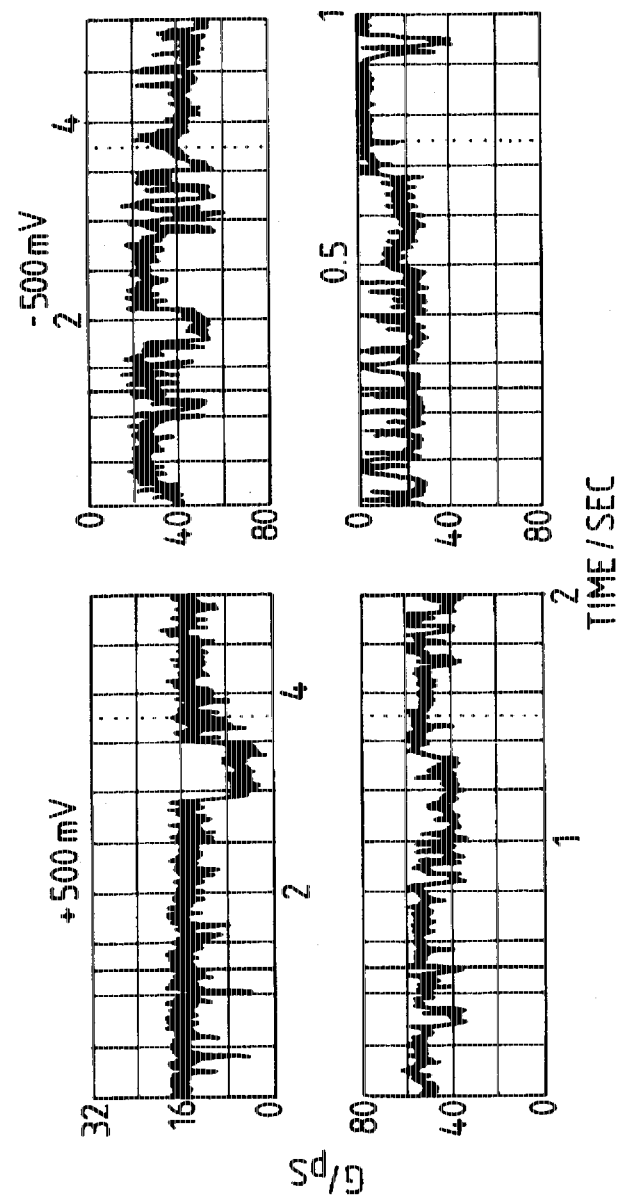
FIG. 7: shows patch—pipette currents from a track-etched PETP filter.

Rapid switching between high and low conducting states is observed when the bath and pipette contain 0.1M KCl with 0.005M Hepes, pH adjusted to 7.4 with KOH and the overall pore conductance does not exceed 100 pS. Typical results at positive or negative applied potentials are shown for four different pores in FIG. 7.

Figure 8:
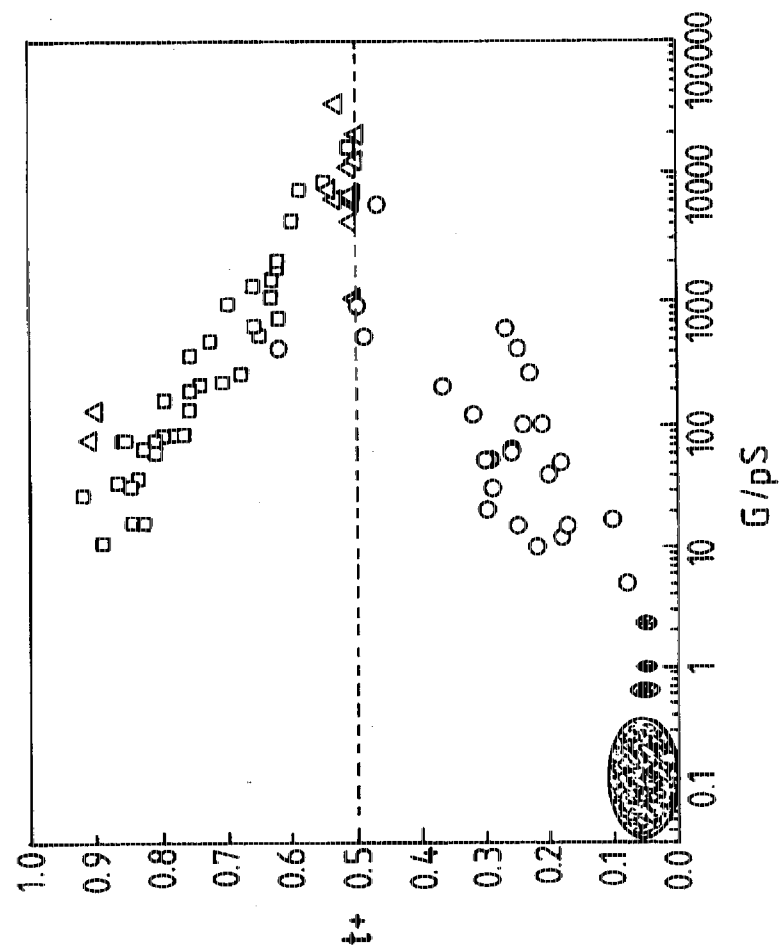
FIG. 8: shows ionic selectivity of pores in track-etched PETP filters and in such filters coated with PMVP.

Selectivity of ion currents through individual pores using the apparatus shown in FIG. 5 was assessed from the reversal potential (the applied potential at which no ion current flows) observed when the pipette contained 1M and the bath 0.2M KCl each with 0.005M Hepes, pH adjusted to 7.4 with KOH. Cation selectivity, indicated by transference numbers ($t_+$) in excess of 0.5, is observed for pores in track-etched PETP filters whereas anion selectivity ($t_+$ less than 0.5) is observed in similar filters coated with polyvinylmethylpyridine (PVMP) to confer positive surface charge on the PETP. In either case pores with conductances greater than 1000 pS show little selectivity ($t_+$=0.5); selectivity increases, for cations with PETP filters and for anions with PVMP coated filters, progressively as pore conductance diminishes (FIG. 8).

REFERENCES

1. Neher E and Sakmann B Nature 260, 799–802 (1976).
2. Hille B. Ionic Channels of Excitable Membranes. Sinauer Associates Inc., Sunderland, Mass. (1984) pp 277, 303–353.
3. Apel P Y, Didyk A, Kravels L I and Kuznetsov V I Nucl. Tracks Radiat. Meas. 17 191–193 (1990).
4. Pasternak C A, Bashford C L, Korchev Y E, Rostovtseva T K and Lev A A. (1993) Colloids and Surfaces A: Physicochemical Engineering Aspects 77 119–124.
5. Bezrukov S. M. and Kasianowicz J J Bull. Am. Phys. Soc. 37, 625 (1992).
6. Barrer R M and Rees L V C. Trans Faraday Soc. 56 709–721 (1960).
7. Edmonds D T, Proc. R. Soc. B. 211 51–62 (1980).
8. Edmonds D T. In: Biological Membranes Vol. 5 (Ed D Chapman) Academic Press Inc. pp 341–379 (1984).
9. MacKay D H C, Berens P H and Wilson K R. Biophys. J. 46, 229–248 (1984).
10. Barrer R M and Hinds L. J. Chem. Soc. 1879–1888 (1953).
11. Papazian D M, Timpe L C, Jan Y N and Jan L Y. Nature 349 305–310 (1991).
12. Yool A J and Schwarz T J, Nature 349 700–704 (1991).
13. Stuhmer W, Conti F, Suzuki H, Wang X, Noda M, Yahagi N, Kubo H and Numa S. Nature 339 597–603.

We claim:

1. A process for controlling permeability to ions and uncharged molecules through a pore of a synthetic membrane said pore being selected from a hole through said membrane and the space between two apposed surfaces, said apposed surfaces forming said synthetic membrane, said pore having discrete states of differing permeability and, when said pore is a hole through said synthetic membrane, said pore being of less than 10 nanometers radius or, when said pore is formed from two apposed surfaces, said pore being of less than 20 nanometers width, which process comprises placing the pore between a first solution containing an ion, referred to as the transport ion, or uncharged molecule capable of passing through the pore, and a second solution;

and controlling the permeability of ions or uncharged molecules through the pore by means of the transport ion concentration in the first solution and/or proton or multivalent ion concentration in the first and/or second solution.

2. A process according to claim 1 in which the pore has been created through a synthetic membrane by a track-etch procedure.

3. A process according to claim 1 in which the pore is through a polyester membrane and is of less than 10 nanometers radius.

4. A process according to claim 1 in which the pore comprises two apposed synthetic membranes less than 20 nanometers apart.

5. A process according to claim 4 in which the apposed membranes have been etched.

6. A process according to claim 1 where the first solution is salinated water whereby differential flow of ions through the pore causes desalination of the water, the desalination being controlled by means of the concentration of protons or divalent cations in the first solution.

7. A switch for ionic current comprising a pore of less than 10 nm radius through a synthetic membrane film or comprising two apposed synthetic membranes less than 20 nm apart forming a pore between the membranes, said pore being capable of exhibiting discrete states of differing permeability when simultaneously in contact with a first ionic solution containing an ion capable of being transported through the pore, the transport ion, and with a second ionic solution, the switch being such that when it is placed in an electric circuit, flow of ionic current through the pore may be controlled by transport ion concentration in the first ionic solution and/or porton or multivalent ion concentration in one or both of the said ionic solutions, causing the pore to exhibit a discrete state of permeability.

8. A switch as defined in claim 7 in which the pore has been created through a synthetic membrane by a track-etch procedure.

9. A sensor for sensing a parameter in a solution, said sensor comprising a pore of less than 10 nanometers radius through a synthetic membrane or comprising two apposed synthetic membranes less than 20 nm apart forming a pore between the membranes, said pore having discrete states of differing permeability, such that when the pore is placed in contact with the solution whose parameter is to be detected, the ionic current passing through the pore depends on ion and/or proton concentration in the solution and is indicative of the presence, absence or level of the parameter to be detected.

10. A sensor as defined in claim 9 in which the pore has been created through a synthetic membrane by a track-etch procedure.

* * * * *